United States Patent
Fedorov et al.

(10) Patent No.: US 11,240,156 B2
(45) Date of Patent: Feb. 1, 2022

(54) TECHNIQUES FOR STEERING NETWORK TRAFFIC TO REGIONS OF A CLOUD COMPUTING SYSTEM

(71) Applicant: NETFLIX, INC., Los Gatos, CA (US)

(72) Inventors: Sergey Fedorov, Los Gatos, CA (US); Phelps Watson Williams, Los Gatos, CA (US); Niosha Behnam, Campbell, CA (US)

(73) Assignee: NETFLIX, INC., Los Gatos, CA (US)

( * ) Notice: Subject to any disclaimer, the term of this patent is extended or adjusted under 35 U.S.C. 154(b) by 136 days.

(21) Appl. No.: 16/693,180

(22) Filed: Nov. 22, 2019

(65) Prior Publication Data

US 2021/0075729 A1 Mar. 11, 2021

Related U.S. Application Data

(60) Provisional application No. 62/897,116, filed on Sep. 6, 2019.

(51) Int. Cl.
*H04L 12/803* (2013.01)
*H04L 12/851* (2013.01)
(Continued)

(52) U.S. Cl.
CPC ............ *H04L 47/125* (2013.01); *G06F 17/11* (2013.01); *H04L 43/0864* (2013.01);
(Continued)

(58) Field of Classification Search
CPC .. G06F 17/11; H04L 43/0852; H04L 43/0864; H04L 47/125; H04L 47/2441;
(Continued)

(56) References Cited

U.S. PATENT DOCUMENTS 9,037,643 B2 * 5/2015 Kazerani ............. H04L 67/2838
709/203
9,424,363 B2 * 8/2016 Kazerani ............... H04L 65/602
(Continued)

FOREIGN PATENT DOCUMENTS

KR 101727059 B1 * 4/2017
WO 02/07012 A2 1/2002

OTHER PUBLICATIONS

International Search Report for application No. PCT/US2020/049264 dated Nov. 13, 2020.
(Continued)

*Primary Examiner* — George C Neurauter, Jr.
(74) *Attorney, Agent, or Firm* — Artegis Law Group, LLP

(57) ABSTRACT

In various embodiments, domain name system (DNS) servers are implemented on a content distribution network (CDN) infrastructure in order to facilitate centralized control of traffic steering. Each server appliance in the CDN infrastructure acts as both an authoritative DNS nameserver and a dynamic request proxy, and each such server appliance is assigned to one of multiple cloud computing system regions. The assignment of server appliances to cloud regions is based on latency measurements collected via client application probes and an optimization that minimizes an overall latency experienced by the client applications subject to constraints that the maximum traffic to each cloud region is less than a capacity constraint for that region, the maximum deviation of traffic to each cloud regions at any point in time is less than a given percentage, and the maximum deviation of traffic between direct and indirect paths is less than a given percentage.

20 Claims, 9 Drawing Sheets

(51) Int. Cl.
*G06F 17/11* (2006.01)
*H04L 29/08* (2006.01)
*H04N 21/239* (2011.01)
*H04L 12/26* (2006.01)
*H04L 29/12* (2006.01)
*H04L 29/06* (2006.01)

(52) U.S. Cl.
CPC ...... *H04L 47/2441* (2013.01); *H04L 61/1511* (2013.01); *H04L 67/101* (2013.01); *H04L 67/1021* (2013.01); *H04L 67/1036* (2013.01); *H04L 67/28* (2013.01); *H04N 21/239* (2013.01); *H04L 65/4084* (2013.01); *H04L 67/1008* (2013.01); *H04L 67/1012* (2013.01)

(58) Field of Classification Search
CPC ............. H04L 61/1511; H04L 65/4084; H04L 67/1002; H04L 67/1008; H04L 67/101; H04L 67/1012; H04L 67/1021; H04L 67/1025; H04L 67/1036; H04L 67/28; H04N 21/239
See application file for complete search history.

(56) References Cited

U.S. PATENT DOCUMENTS

| | | | | |
|---|---|---|---|---|
| 9,961,152 B2* | 5/2018 | Kazerani | ................ | G06F 16/29 |
| 10,268,492 B2* | 4/2019 | Suryanarayanan | ..... | G06F 9/452 |
| 10,298,968 B2* | 5/2019 | Sletmoe | ................ | H04N 21/234 |
| 10,511,675 B1* | 12/2019 | Chud | .................... | H04L 67/101 |
| 10,743,036 B1* | 8/2020 | Farris | .................... | H04N 21/251 |
| 10,785,029 B2* | 9/2020 | Gupta | .................. | G06F 9/45558 |
| 10,880,232 B1* | 12/2020 | Goodman | ................ | G06F 16/29 |
| 10,911,505 B1* | 2/2021 | Brazeau | ............. | H04L 65/4084 |
| 10,931,988 B2* | 2/2021 | Sletmoe | ............. | H04N 21/2408 |
| 2014/0280480 A1* | 9/2014 | Kazerani | ............. | H04L 67/2823 |
| | | | | 709/203 |
| 2014/0280818 A1* | 9/2014 | Kim | ........................ | G06F 9/505 |
| | | | | 709/223 |
| 2015/0095516 A1 | 4/2015 | Bergman | | |
| 2021/0029075 A1* | 1/2021 | Yu | ........................ | H04L 67/1002 |
| 2021/0120075 A1* | 4/2021 | Brazeau | ............. | H04L 43/0864 |

OTHER PUBLICATIONS

Mohamed et al., "Implementation of Server Handover for Live Streaming Application during High Traffic with Bitrate Adaptation", International Journal of Hybrid Information Technology, XP055747177,ISSN: 1738-9968, DOOI:10.14257/ijhit.2016.9.8.05, vol. 9, No. 8, Aug. 31, 2016, pp. 43-52.

Farlow et al., "Greedy Heuristics for Client Assignment Problem by Zones", The Foundations of Digital Games, ACM, XP058371096, DOI: 10.1145/3102071.3102087, ISBN: 978-1-4503-5319-9, Aug. 14-17, 2017, pp. 1-10.

* cited by examiner

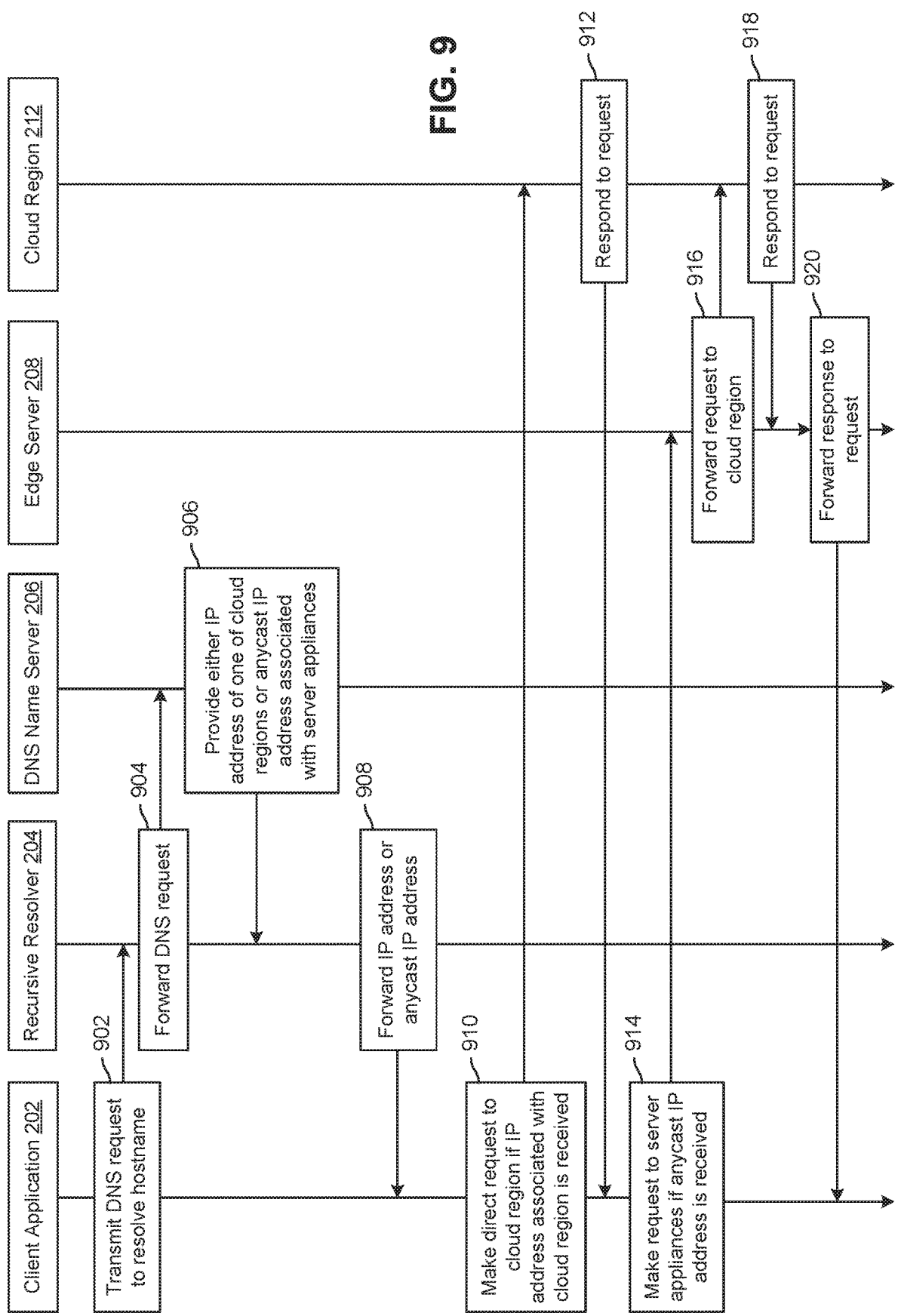

TECHNIQUES FOR STEERING NETWORK TRAFFIC TO REGIONS OF A CLOUD COMPUTING SYSTEM

CROSS-REFERENCE TO RELATED APPLICATIONS

This application claims priority benefit of the United States Provisional Patent Application titled, "TECHNIQUES FOR LOAD BALANCING AND MANAGING LATENCIES ACROSS GEOGRAPHIC REGIONS," filed on Sep. 6, 2019 and having Ser. No. 62/897,116. The subject matter of this related application is hereby incorporated herein by reference.

BACKGROUND

Field of the Invention

Embodiments of the present disclosure relate generally to computer networking and, more specifically, to techniques for steering network traffic to regions of a cloud computing system.

Description of the Related Art

Web services, which can serve clients worldwide, are oftentimes hosted on cloud computing systems. In particular, multiple regions of a cloud computing system can be used to host a service in order to provide resiliency and minimize latency. As used herein, a "region" of a cloud computing system refers to a geographical area, such as the eastern United States or western United States, where resources and data can be placed in the cloud computing system. Regions of a cloud computing system are also referred to herein as "cloud regions."

The distribution of network traffic to various cloud regions can be shaped to reduce the latency experienced by client applications, among other things. Such a shaping of traffic is also referred to herein as "steering" the traffic. FIG. 1 is a conceptual diagram illustrating two techniques for steering traffic. As shown, traffic from a client application 101 can be steered to three regions $108_{1-3}$ of a cloud computing system (collectively referred to as "cloud regions 108" and individually referred to as "cloud region 108") via both direct paths 120, 122, and 124 and indirect paths 130, 132, and 134, over which traffic is proxied through a content distribution network ("CDN") server 106. Although one CDN server 106 is shown for illustrative purposes, a CDN may generally include a geographically distributed group of servers (e.g., thousands of servers). The servers of a CDN can be used to (1) accelerate the delivery of static content by caching static content (e.g., images, videos) on edge servers of the CDN that communicate with clients, and/or (2) accelerate the delivery of dynamic content (e.g., application programming interface (API) requests to cloud regions) by proxying requests for dynamic content, which are also referred to herein as "dynamic requests," i.e., by acting as a dynamic request proxy.

Each of the cloud regions 108 is a geographical area where resources and data can be placed in the cloud computing system. For example, the Amazon Web Services (AWS®) cloud includes Eastern United States, Western United States, and Western Europe regions, among others. Each of the cloud regions 108 can include any number and type of compute instances implementing one or more applications and/or subsystems of applications.

As described, network traffic from the client application 101 to the cloud regions 108 can traverse one of the direct paths 120, 122, and 124 or the indirect paths 130, 132, and 134 via the CDN server 106. In order for the client application 101 to transmit a dynamic request via one of the direct paths 120, 122, or 124, the client application 101 needs to obtain an IP address associated with the corresponding cloud region $108_1$, $108_2$, or $108_3$. To obtain the IP address associated with the corresponding cloud region 108, the client application 101 can make a domain name system ("DNS") request, also sometimes referred to as a "DNS query," based on a hostname entered by a user (e.g., "example.com"). A recursive resolver is the first stop for a DNS request and is responsible for performing recursive lookups against authoritative DNS nameservers, until a nameserver is reached that can translate the hostname into an IP address. Illustratively, the client application 101 sends a DNS request to a recursive resolver 112, which is in communication with an authoritative DNS nameserver 114.

In some cases, the authoritative DNS nameserver 114 may translate a full hostname into an IP address associated with one of the cloud regions 108 that is geographically closest to the location of the recursive resolver 112. An EDNS client subnet (ECS) may also be used. Typically, the authoritative DNS nameserver 114 steers traffic from the client application 101 to one of the cloud regions 108 (along a corresponding one of the direct paths 120, 122, or 124) based on geographical proximity of the recursive resolver 112, which received the DNS request from the client 101, to that cloud region 108. Geographic locations of the cloud regions 108 and the recursive resolver 112 can be stored within a geographical database of the authoritative DNS nameserver 114. In other words, traffic from the client application 101 can be directed to one of the cloud regions 108 based on stored geographical information.

In order for the client application 101 to make dynamic requests via one of the indirect paths 130, 132, or 134, the client application 101 can obtain, via DNS, an IP address associated with the CDN server 106 that is translated from a hostname. More specifically, the client application 101 can obtain an IP address of a dynamic request proxy node included in the CDN server 106. The particular cloud region 108 to which the dynamic request proxy forwards requests from the client application 101 is preconfigured based on various factors, including the volume of requests that the dynamic request proxy previously received, the latency from the dynamic request proxy to each of the cloud regions 108, etc.

One drawback of the above traffic steering techniques for region balancing purposes is that separate mechanisms are used to control the steering of traffic across direct paths (e.g., paths 120, 122, and 124) and indirect paths (e.g., paths 130, 132, and 134) via dynamic request proxies. As described, request load steering for direct paths is controlled based on geographical information maintained by authoritative DNS nameservers (e.g., the authoritative DNS nameserver 114), while request load steering for indirect paths is controlled by preconfigured dynamic request proxies. As direct and indirect traffic flows to cloud regions are controlled separately using different models by the authoritative DNS nameservers and the dynamic request proxies, respectively, request loads can shift substantially over time between cloud regions. Such shifts in request loads between cloud regions must be accounted for with relatively large amounts of cloud capacity, or cloud resources headroom. As used herein, "cloud resources headroom" refers to an amount of buffer cloud capacity required to handle peak traffic loads. Further, the separate control of request load steering via direct and indirect paths to cloud regions means that request load steering cannot be coordinated to reduce the overall latency experienced by client applications. In particular, the geographical traffic steering used by authoritative DNS nameservers is not a good proxy for latency, meaning latency is generally not minimized by such traffic steering. With an expanding user base, a geographical database may also need to be frequently adjusted to rebalance traffic across cloud regions. Separately controlling request load steering for direct and indirect paths also introduces multiple potential points of failure. In addition to shifts between cloud regions, shifts between direct and indirect paths may occur as client traffic shifts between the two types of paths, and such shifts are not accounted for by conventional region balancing techniques.

As the foregoing illustrates, what is needed in the art are more effective techniques for steering network traffic to different regions of a cloud computing system.

SUMMARY OF THE EMBODIMENTS

One embodiment of the present disclosure sets forth a computer-implemented method for configuring network traffic steering to a plurality of regions of a cloud computing system. The method includes receiving a plurality of measurements of latencies across a plurality of network paths between a plurality of client applications and the plurality of regions of the cloud computing system. The method further includes determining, based on the measurements, an assignment of each server included in a plurality of servers to one of the regions included in the plurality of regions of the cloud computing system. Each server included in the plurality of servers includes an authoritative domain name system (DNS) nameserver and a dynamic request proxy. In addition, the method includes configuring each server included in the plurality of servers based on the assignment of the server to the one of the regions included in the plurality of regions of the cloud computing system.

Another embodiment of the present disclosure sets forth a computer-readable storage medium including instructions that, when executed by a processor, cause the processor to configure network traffic steering to a plurality of regions of a cloud computing system by performing steps. The steps include receiving a plurality of measurements of latencies across a plurality of network paths between a plurality of client applications and the plurality of regions of the cloud computing system. The steps further include determining, based on the measurements, an assignment of each server included in a plurality of servers to one of the regions included in the plurality of regions of the cloud computing system. Each server included in the plurality of servers performs functionalities of an authoritative DNS nameserver and an edge server of a CDN. In addition, the steps include configuring each server included in the plurality of servers based on the assignment of the server to the one of the regions included in the plurality of regions of the cloud computing system.

Another embodiment of the present disclosure sets forth a system including a plurality of probes executing on corresponding client devices. Each probe included in the plurality of probes measures latencies across a plurality of network paths from the corresponding client to a plurality of regions of a cloud computing system. The system further includes an optimization application that, when executed on a computing device, steers network traffic to a plurality of regions of a cloud computing system by performing steps. The steps include receiving the measured latencies from the plurality of probes, and determining, based on the measured latencies, an assignment of each server included in a plurality of servers to one of the regions included in the plurality of regions of the cloud computing system. The steps further include configuring each server included in the plurality of servers based on the assignment of the server to the one of the regions included in the plurality of regions of the cloud computing system.

At least one technical advantage of the disclosed techniques relative to the prior art is that the amount of traffic reaching each of multiple cloud regions is modeled and controlled centrally, with greater precision. In particular, control of network traffic associated with dynamic requests from client applications to cloud regions is aligned between authoritative DNS nameservers and dynamic request proxies by implementing the authoritative DNS nameservers on the CDN infrastructure. Less cloud resources headroom is required as a result of such an alignment, which limits the shifting of traffic between cloud regions, including as clients are shifted between direct and indirect paths. As a result, the alignment provides safety and reliability, as the route that traffic takes has a constrained/known impact on the required cloud capacity to service dynamic requests. Probing and optimization are also performed to determine how traffic can be steered to cloud regions for a desired trade-off of cost, availability, and latency. In particular, the optimization accounts for both direct paths to the cloud regions and indirect paths through dynamic request proxies, permitting a "global" latency reduction. More specifically, the aggregate latency between client applications and cloud regions can be reduced, while reducing the overall size of the cloud infrastructure (e.g., the number of servers) by avoiding "large" regions with high maximum peak traffic, reducing the risk of failure of any cloud region by minimizing how much traffic is sent to each region at any given time, and also constraining the maximum deviation of the traffic sent over direct and indirect paths as client traffic shifts between the two types of paths . . . . In addition, the central control of traffic steering reduces the potential points of failure relative to prior art techniques. Experience has shown that techniques disclosed herein also scale better than prior art approaches in which direct and indirect traffic flows to cloud regions are separately controlled using authoritative DNS nameservers and dynamic request proxies, respectively. These technical advantages represent one or more technological advancements over prior art approaches.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

FIG. 9 is a flow diagram of method steps for request load steering, according to various embodiments.

DETAILED DESCRIPTION

Figure 1:
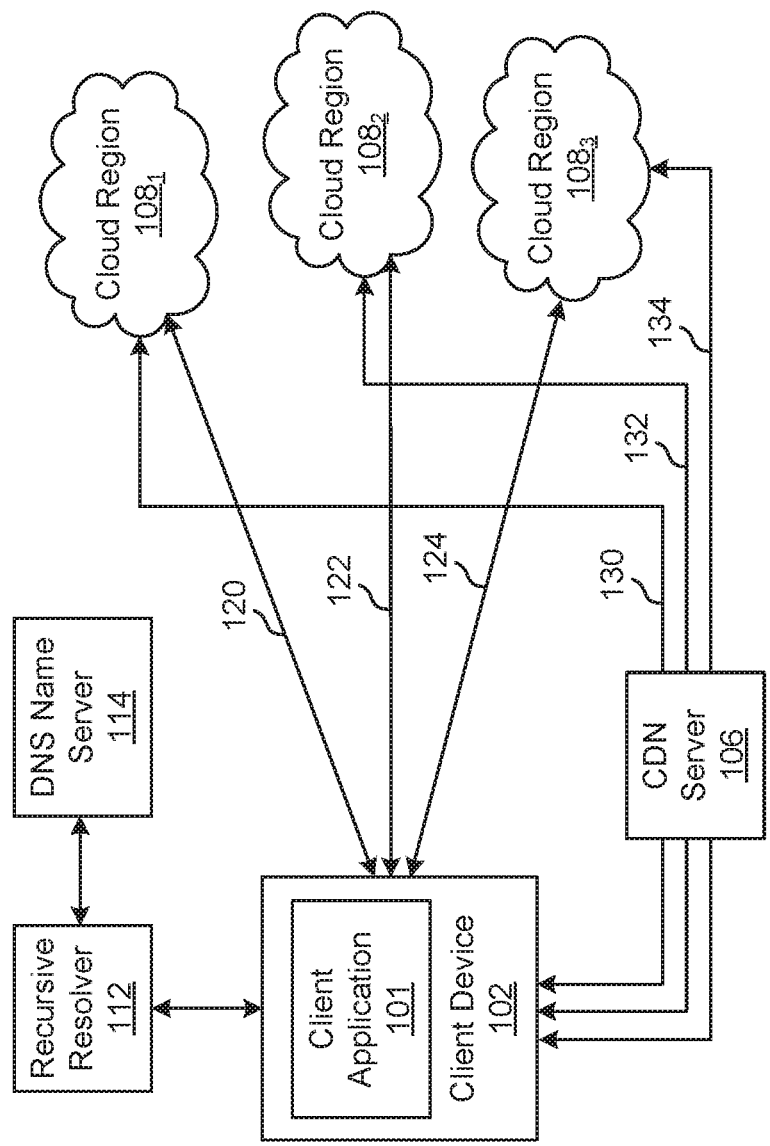
FIG. 1 is a conceptual illustration of a system for steering traffic using domain name system (DNS) and content distribution network (CDN) techniques.

In the following description, numerous specific details are set forth to provide a more thorough understanding of the present disclosure. However, it will be apparent to one skilled in the art that the present disclosure may be practiced without one or more of these specific details.

Excessive latency can negative affect the experiences of users of a web service. In the context of a web service hosted on multiple regions of a cloud computing system, request load steering can be used to distribute network traffic across different cloud regions so as to reduce the latency experienced by client applications. However, prior art techniques for steering network traffic associated with dynamic requests (which is also generally referred to herein as "network traffic" or simply "traffic") to multiple cloud regions use separate mechanisms to control the steering of traffic across direct and indirect paths to the cloud regions. Request load steering for direct paths is controlled based on geographical information maintained by authoritative domain name system (DNS) nameservers. On the other hand, request load steering for indirect paths is controlled by preconfigured dynamic request proxies. As the authoritative DNS nameservers and dynamic request proxies utilize different models and are not synchronized with each other in controlling traffic steering, request loads can shift substantially over time between cloud regions. In addition, the amount of traffic going to cloud regions directly versus indirectly can change based on Internet connectivity and is controlled by a separate system that is not integrated with region steering models used by the authoritative DNS nameservers and dynamic request proxies. The shifting of request load between cloud regions must be accounted for with relatively large amounts of cloud resources headroom, which can be expensive. The lack of synchronization between authoritative DNS nameservers and dynamic request proxies also means that request load steering cannot be coordinated to reduce the overall latency experienced by client applications, which can, in turn, negatively affect user experience. In particular, the geographical traffic steering used by authoritative DNS nameservers is not a good proxy for latency, so latency is generally not optimally minimized by such traffic steering. In addition, the separate control of request load steering for direct and indirect paths introduces multiple potential points of failure.

The disclosed techniques optimize request load steering to regions of a cloud computing system while reducing the amount of cloud capacity required. Notably, authoritative DNS nameservers are implemented on a CDN infrastructure in some embodiments. The CDN infrastructure includes multiple server appliances, each of which includes both an authoritative DNS nameserver and a dynamic request proxy. In addition, each server appliance is assigned to one of the regions of a cloud computing system, such that (1) the authoritative DNS nameserver included in the server appliance responds to DNS requests with an Internet Protocol (IP) address associated with the cloud region, and (2) the dynamic request proxy included in the server appliance proxies requests to the same cloud region. The assignment of server appliances to cloud regions is based on latency measurements collected via client application probes and an optimization that minimizes an overall latency experienced by the client applications subject to constraints that the maximum traffic to each cloud region is less than a capacity constraint for that region, the maximum deviation of traffic to each cloud regions at any point in time is less than a given percentage, and the maximum deviation of traffic between direct and indirect paths is less than a given percentage.

Advantageously, the techniques disclosed herein address various limitations of conventional approaches for steering network traffic to regions of a cloud computing system. More specifically, techniques disclosed herein centrally model and control the amount of traffic reaching each of multiple cloud regions, in contrast to prior art techniques in which traffic flows over direct and indirect paths to cloud regions were controlled separately. The central control of traffic steering reduces the potential points of failure relative to prior art techniques. Further, techniques disclosed herein implement authoritative DNS nameservers on a CDN infrastructure, which limits the potential shifts of traffic between cloud regions and requires less cloud capacity. In addition, techniques disclosed herein perform probing and optimization to determine how traffic can be steered to cloud regions for a desired trade-off of cost, availability, and latency. In particular, the optimization accounts for both direct paths to the cloud regions and indirect paths through dynamic request proxies, permitting a "global" latency reduction. More specifically, the aggregate latency between client applications and cloud regions can be reduced, while reducing the overall size (and therefore cost) of the cloud infrastructure by avoiding "large" regions with high maximum peak traffic, reducing the risk of failure of any cloud region by minimizing how much traffic is sent to each region at any given time, and also constraining the shift of traffic between direct and indirect paths. Experience has shown that techniques disclosed herein also scale better than prior art approaches in which direct and indirect traffic flows to cloud regions are separately controlled using authoritative DNS nameservers and dynamic request proxies, respectively.

System Overview

Figure 2:
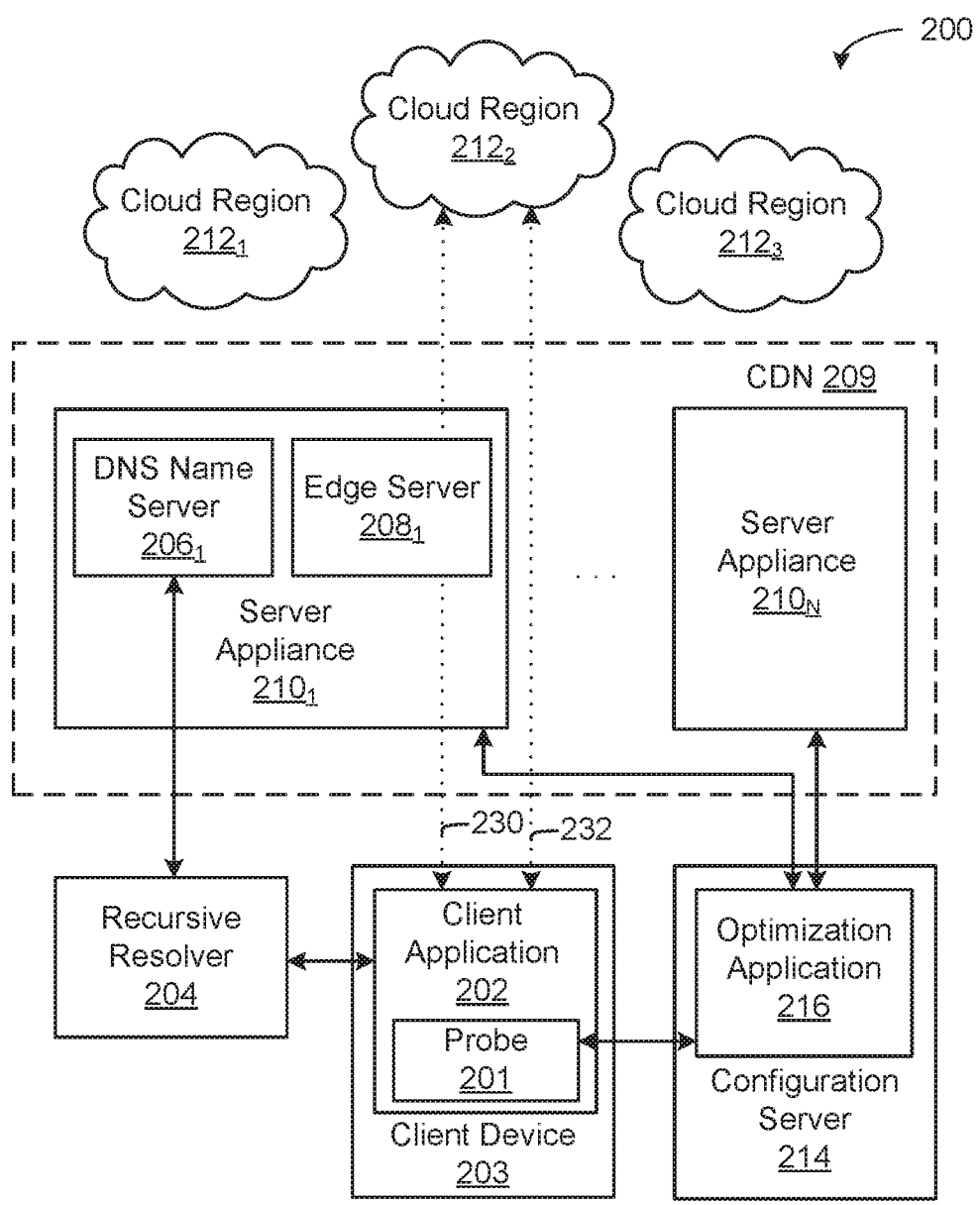
FIG. 2 is a conceptual illustration of a system that is configured to implement one or more aspects of the various embodiments.

FIG. 2 is a conceptual illustration of a system 200 that is configured to implement one or more aspects of the various embodiments. As shown, the system 200 includes a client application 202, which runs on a client device 203, a CDN 209 including multiple server appliances $210_{1-N}$ (collectively referred to herein as "server appliances 210" and individually referred to "server appliance 210"), a recursive resolver 204, and three regions $212_{1-3}$ of a cloud computing system (collectively referred to herein as "cloud regions 212" and individually referred to as "cloud region 212").

Each of the cloud regions 212 may include one or more data centers, each of which may include, without limitation, any number and type of compute instances. Each such compute instance may include, without limitation, a processor such as a central processing unit (CPU), a graphics processing unit (GPU), a controller, a microcontroller, a state machine, or any combination thereof that is capable of executing instructions and a memory that stores content sued by the processor, such as a such as random access memory (RAM), read only memory (ROM), flash drive, hard disk, and/or any other form of digital storage, local or remote. In general, the compute instances included in the cloud regions 212 are configured to implement one or more applications and/or subsystems of applications. For example, applications could execute in the cloud regions 212 that provide a video streaming service.

As shown, network traffic from the client application 202 is steered to region $212_2$ of the cloud computing system. More generally, traffic may be steered to the cloud regions 212 via (1) network paths (e.g., path 232) directly to the cloud regions 212, based on IP addresses of those cloud regions 212 that are provided by authoritative DNS nameservers 206 that also run on the server appliances 210, and (2) network paths (e.g., path 230) over which requests from client applications are proxied through dynamic request proxies 208 running on the server appliances 210 of the CDN infrastructure 209. The CDN infrastructure 209 includes a geographically distributed group of servers, shown as the server appliances 210, that accelerate the delivery of dynamic content by proxying queries for dynamic content, among other things. In contrast to prior art techniques, the server appliances 210 each act as both an edge server of the CDN infrastructure 209 as well as an authoritative DNS nameserver. In some embodiments, each of the server appliances 210 is assigned to one of the cloud regions 212, such that (1) the authoritative DNS nameserver 206 included in the server appliance 210 responds to DNS requests with an IP address associated with that cloud region 212, and (2) the dynamic request proxy 208 included in the server appliance 210 proxies requests to the same cloud region 212. That is, when traffic hits the server appliance 210, then the authoritative DNS nameserver 206 and dynamic request proxy 208 running therein make the same cloud region 212 decision. As a result, there is an empirical alignment of request load steering between direct network paths from client applications to cloud regions 212 and indirect network paths via dynamic request proxies 208. Such an alignment is due to: the small number of cloud regions; the much higher number of server appliances 210; the general traffic alignment between routing of clients to dynamic request proxies 208 via TCP anycast and following the DNS path (via DNS resolvers); and an explicitly modeled constraint, which is discussed in greater detail below, limiting maximum traffic deviation in region allocation when assigning cloud regions 212 to server appliances 210. In addition, embodiments leverage similarities in anycast routing between clients and recursive resolvers the clients use. Although discussed herein with respect to each server appliance 210 being assigned to a single cloud region 212 for simplicity, in other embodiments server appliances 210 may be assigned to multiple cloud regions 212 based on different policies.

In operation, the client application 202 transmits a DNS request to the recursive resolver 204, which as described is the first stop in a DNS query and responsible for performing recursive lookups against authoritative DNS nameservers, until a nameserver is reached that can translate the full hostname into an IP address. Illustratively, the DNS request is routed by the recursive resolver 204 to the authoritative DNS nameserver $206_1$. This assumes that the recursive resolver 204 has not cached the translation of the hostname to an IP address, in which case the DNS request would not need to be routed to the authoritative DNS nameserver $206_1$.

The server appliance to which DNS requests from a client application are routed is also referred to herein as the server appliance that "services" the client application, which is "serviced by" the server appliance. In some embodiments, the recursive resolver 204 may route the DNS request to a particular server appliance 210 based on the network location of the resolver 204 relative to the network location of the server appliances 210, such as routing the DNS request to a closest (in terms of number of hops) server appliance 210 to the resolver 204. In turn, the authoritative DNS nameserver 206 running in the server appliance 210 to which the DNS request is routed responds with either (1) an anycast IP address associated with the dynamic request proxies 208; or (2) an IP address associated with one of the cloud regions 212 for direct requests to that cloud region 212. Anycast is a network addressing and routing methodology that permits a single IP address to have routing paths to multiple endpoint destinations. In other embodiments, a unicast IP address associated with a dynamic request proxy 208 may be provided by the authoritative DNS nameserver $206_1$ rather than an anycast IP address. The percentage of direct IP addresses to anycast IP addresses that the authoritative DNS nameserver 206 responds with may be configured in any technically feasible manner. For example, request load could be shifted back and forth between direct and indirect paths, depending on whether the dynamic request proxies 208 are having issues (in which case the direct paths would be used), by having the authoritative DNS nameserver 206 respond with different percentages of direct and anycast IP addresses. As another example, traffic could be sent entirely through the dynamic request proxies 208 if there are Internet ingress problem for specific cloud region(s).

In the case of the anycast IP address, the dynamic request proxy 208 to which a request that includes the anycast IP address is routed will depend on anycast routing, which generally routes requests along paths with the least number of hops. Therefore, it should be understood that the server appliance 210 including the dynamic request proxy 208 to which such a request is routed may or may not be different from the server appliance $210_1$ in which the authoritative DNS nameserver $206_1$ runs, although both are illustrated in FIG. 1 as the same server appliance $210_1$ for simplicity. As the server appliance 210 that includes an authoritative DNS nameserver 206 that provides a direct IP address to a cloud region may be different than the server appliance 210 that includes an dynamic request proxy 208 that proxies requests from a client application, the empirical alignment of cloud region steering between direct and indirect network paths, described above, is an alignment in the aggregate, when all traffic from all client applications to the cloud regions 212 is considered.

In some embodiments, each of the server appliances 210 is assigned to one of the cloud regions 212 based on an optimization that reduces an overall latency experienced by client applications, including the client application 202. As shown, such an optimization is performed by an optimization application 216 that runs in one of the cloud regions $212_3$. In some embodiments, the optimization performed by the optimization application 216 includes solving a linear programming model to minimize a cost function, also sometimes referred to as an "objective function," that is defined based on the overall latency, subject to constraints that (1) the maximum traffic to each of the cloud regions 212 is less than a capacity constraint for that region, which may be specified by a user according to a desired traffic shape of the percentage of traffic that is directed to each of the cloud regions 212; (2) the maximum deviation of traffic to each of the cloud regions 212 at any point in time is less than a given percentage; and (3) the maximum deviation of traffic between direct and indirect paths (as client traffic shifts between the two types of paths) is less than a given percentage, as discussed in greater detail below in conjunction with FIG. 8. The constraint on the maximum traffic is an absolute constraint on the peak amount of traffic to each of the cloud regions 212, whereas the constraint on the maximum deviation of traffic is a relative constraint that the amount of traffic to each of the cloud regions 212 is not significantly different from the amount of traffic to other cloud regions 212. It should be understood that the constraint on the maximum traffic relates to infrastructure costs, as it is more expensive to handle a greater amount of traffic, while the constraint on the maximum deviation of traffic relates to availability risk, as the maximum percentage of the traffic share that is sent to each cloud region can affect whether the service remains available from that cloud region, i.e., whether a service outage occurs in the region. It is desirable to minimize the number of users impacted by a service outage. In addition, the constraint on the direct/indirect maximum traffic deviation balances the traffic sent over direct and indirect paths as client traffic shifts between the two types of paths. Probe data, discussed in greater detail below, can be used to determine when an authoritative DNS nameserver 206 and a dynamic request proxy 208 servicing a particular client are on two different server appliances 210, which is a problem when the two server appliances 210 are assigned to different cloud regions 212. The constraint on the direct/indirect maximum traffic deviation ensures the number of such split clients are below a predefined constraint. As a result, the linear programming optimization can be used to balance latency, infrastructure costs, and availability risk based on user preferences.

In some embodiments, the optimization application 216 performs the optimization described above periodically. For example, the optimization application 216 could perform the optimization once per day, or a shorter interval of time, to update the assignment of the server appliances 210 to the cloud regions 212. Doing so helps to account for natural changes in the Internet topology.

As shown, the client application 202 includes a probe 201 that, in some embodiments, is configured to (1) determine the server appliance 210 that services the client application 202, and (2) measure network latencies across each possible network path from the client application 202 to the cloud regions 212, which may include direct paths to the cloud regions 212 as well as indirect paths via which requests are proxied through dynamic request proxies 208 of the CDN infrastructure 209. The server appliance 210 that services the client application 202 is determined by tracing the path of probes, which can be used to identify which service appliance 210 includes an authoritative DNS nameserver 206 that provides a direct IP address to one of the cloud regions 212, in the case of direct requests to the cloud region 212, and which service appliance 210 includes a dynamic request proxy 208 that proxies dynamic requests from the client application 202, in the case of indirect requests that are proxied through the dynamic request proxy 208. The measurement of network latencies across each possible network path from the client application 202 to the cloud regions 212 provides a "latency map" of how the client application 202 is connected to the cloud regions 212, via network paths that do and do not involve dynamic request proxies 208. In addition, in some embodiments, probes 201 run some percentage of the time on each client application 202, such that the distribution of probe measurements on the network matches the distribution users. For example, if there are 10 times more probes from network A leveraging a specific server appliance as compared to network B, then it can be inferred that the actual request volume from network A will be 10 times that of network B. As another example, the request volume that a specific server appliance will be responsible for directing can be estimated.

In some embodiments, probing is performed after each time a client application, such as the client application 202, is started, as discussed in greater detail below in conjunction with FIGS. 6-7. In such cases, probes included in the client applications may each request a set of tests to perform from the optimization application 216 (or another source) after the client applications are started, perform the set of tests to measure network latency across possible paths to the cloud regions 212 and determine the server appliance 210 that services the client application, and send the test results back to the optimization application 216. Although described herein primarily with respect to requesting tests to perform and sending test results back to the optimization application 216 for simplicity, it should be understood that tests may be requested from elsewhere and test results sent elsewhere. For example, in some embodiments, test results may be sent to a logging infrastructure, from which the optimization application 216 may read the test results. Using the test results that indicate the measured latencies across different paths for client applications 202 that are serviced by each of the server appliances 210, the optimization application 216 can optimize the assignment of the server appliances 210 to the cloud regions 212, such as by solving a linear programming model, as discussed in greater detail below in conjunction with FIG. 8.

Subsequent to the determining of the assignment of the server appliances 210 to the cloud regions 212, the server appliances 210 are configured to use the determined assignment. In some embodiments, the server appliances 210 retrieve their assigned cloud regions 212 from the optimization application 216 running within a cloud region 212. In other embodiments, the configuration from the optimization application 216 may be distributed to all of the cloud regions 212, so that the server appliances 210 can contact any cloud region 212 for an updated state. In particular, the server appliances 210 may attempt to gather their configuration from all of the cloud regions regardless 212 of the cloud region 212 assigned to any particular server appliance 210 for DNS responses and dynamic request proxying. Doing so provides resiliency in case there is an outage impacting one of the cloud regions 212. In some embodiments, an incrementing serial number is used to track configuration versions to prevent an old version from taking precedence over a newer version.

For explanatory purposes only, three cloud regions 212, one client device 202, one optimization application 216, and one recursive resolver 204, are shown in FIG. 2. However, as persons skilled in the art will recognize, the system 200 may generally include any number of cloud regions, client devices, configuration servers, and recursive resolvers. Each of the client devices, server appliances, configuration servers, and recursive resolvers may be a physical computing system or a virtual computing system running in, e.g., a data center or cloud. Further, functionality of each application running in the cloud regions, client devices, recursive resolvers, configuration servers, and server appliances may be distributed across any number of other computing devices, or functionality of any number of applications may be consolidated into a single application or subsystem.

Figure 3:
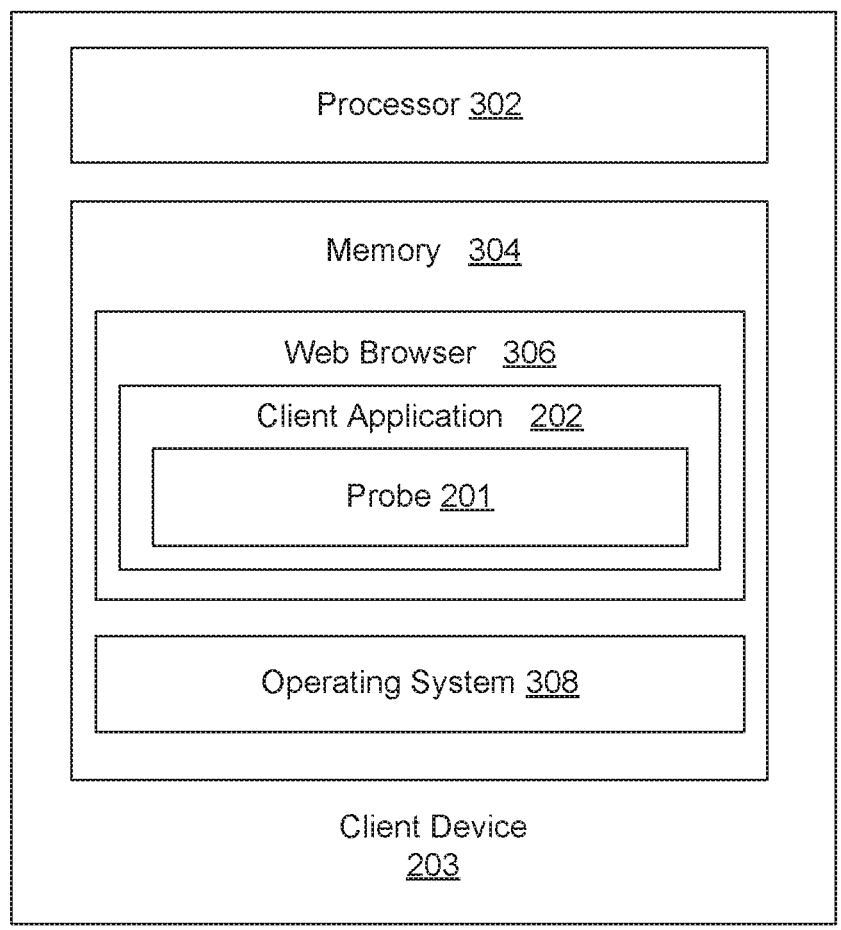
FIG. 3 is a more detailed illustration of the client device of FIG. 2, according to various embodiments.

FIG. 3 is a more detailed illustration of the client device 203 of FIG. 2, according to various embodiments. As shown, the client device 203 includes, without limitation, a processor 302 and a memory 304. The processor 302 may be any instruction execution system, apparatus, or device capable of executing instructions. For example, the processor 302 could comprise a CPU, a GPU, a controller, a microcontroller, a state machine, or any combination thereof. The memory 304 stores content, such as software applications and data, for use by the processor 302.

The memory 304 may be one or more of a readily available memory, such as random access memory (RAM), read only memory (ROM), floppy disk, hard disk, or any other form of digital storage, local or remote. In some embodiments, a storage (not shown) may supplement or replace the memory 304. The storage may include any number and type of external memories that are accessible to the processor 302. For example, and without limitation, the storage may include a Secure Digital Card, an external Flash memory, a portable compact disc read-only memory (CD-ROM), an optical storage device, a magnetic storage device, or any suitable combination of the foregoing.

As shown, the system memory 304 stores a web browser 406, the client application 202, and an operating system 308 on which the web browser 406 runs. The operating system 308 may be, e.g., Linux®, Microsoft Windows®, or Android™. Illustratively, the client application 202 is a web application running in the web browser 306. Although shown as a web application for illustrative purposes, the client application 202 may be implemented as a native application or other type of software in alternative embodiments. Further, functionality of the client application 202 may be distributed across multiple pieces of software in some embodiments. In some embodiments, the client application 202 includes the probe 201 that is responsible for requesting and performing a set of tests to determine the server appliance 210 that services the client application 202 and measure the latencies across multiple direct and indirect network paths to the cloud regions 212. The probe then sends the determined server appliance 210 and the measured latencies to the optimization application 216, as discussed in greater detail below in conjunction with FIGS. 6-7.

Figure 4:
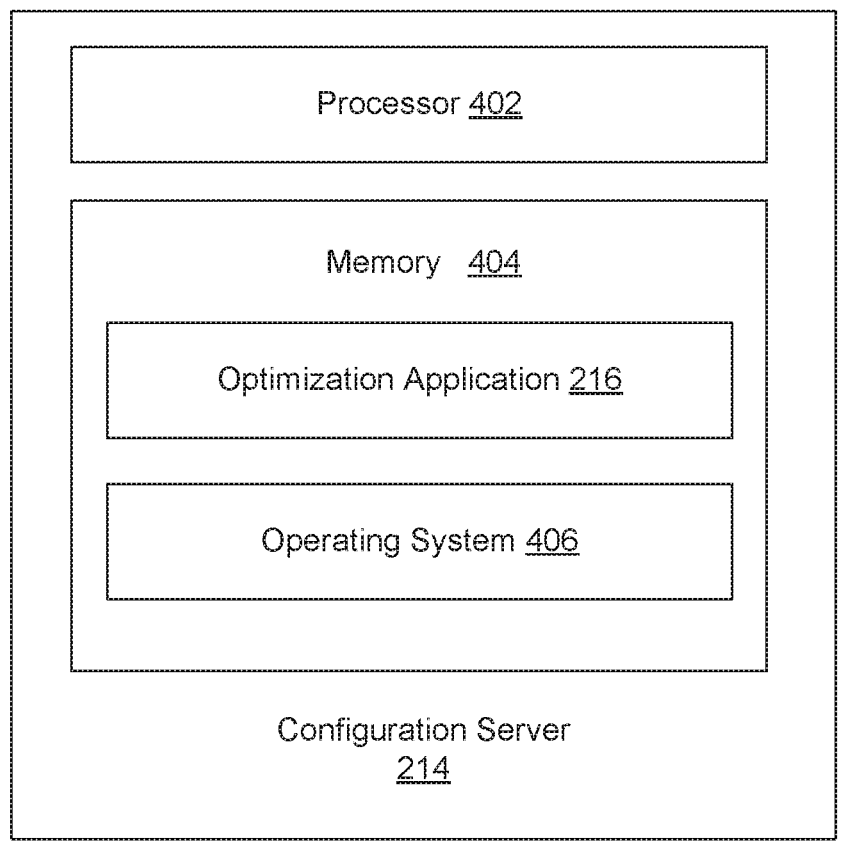
FIG. 4 is a more detailed illustration of the configuration server of FIG. 2, according to various embodiments.

FIG. 4 is a more detailed illustration of a configuration server 400 in which the optimization application 216 may run, according to various embodiments. In some embodiments, the configuration server 400 running the optimization application 216 may be included in one of the cloud regions 212, as described above in conjunction with FIG. 2. As shown, the configuration server 400 includes a processor 402 and a memory 404, which may perform similar functionalities as the processor 302 and the memory 304, respectively, of the client device 203 described above in conjunction with FIG. 3. In some embodiments, a storage (not shown) may supplement or replace the memory 404.

As shown, the memory 404 stores the optimization application 216 and an operating system 406 on which the optimization application 216 runs. In some embodiments, the optimization application 216 is configured to transmit sets of tests to probes within client applications such as the client application 202, receive test results from such probes indicating the server appliances that service those client applications and measured latencies across direct and indirect network paths from those client applications to the cloud regions 212, determine an assignment of server appliances 210 to cloud regions 212 that minimizes an overall latency subject to constraints that the maximum traffic to each of the cloud regions 212 is less than a capacity constraint for that region, the maximum deviation of traffic to each of the cloud regions 212 is less than a given percentage, and the maximum deviation of traffic between direct and indirect paths is less than a given percentage, and distribute the determined assignment configuration to the server appliances 210, as discussed in greater detail below in conjunction with FIGS. 6 and 8.

Figure 5:
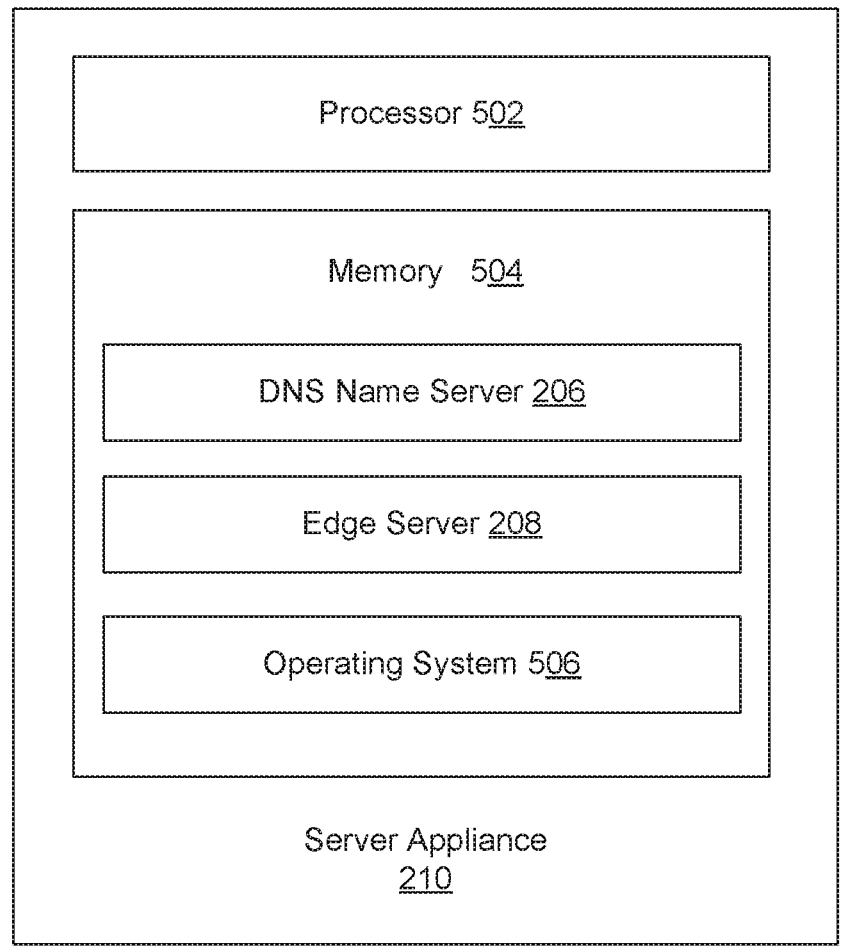
FIG. 5 is a more detailed illustration of one of the server appliances of FIG. 2, according to various embodiments.

FIG. 5 is a more detailed illustration of one of the server appliances 210 of FIG. 2, according to various embodiments. As shown, the server appliance 210 includes a processor 502 and a memory 504, which may perform similar functionalities as the processor 302 and the memory 304, respectively, of the client device 203 described above in conjunction with FIG. 3. In some embodiments, a storage (not shown) may supplement or replace the memory 504.

As shown, the memory 504 stores the authoritative DNS nameserver 206, the dynamic request proxy 208, and an operating system 506. In some embodiments, the authoritative DNS nameserver 206 and the dynamic request proxy 208 are implemented as software. For example, the authoritative DNS nameserver 206 and the dynamic request proxy 208 could be applications running on the operating system 506. In some embodiments, the dynamic request proxy 208 is configured to proxy requests from client applications to one of the cloud regions 212, thereby providing accelerated response retrieval. In some embodiments, the authoritative DNS nameserver 206 is configured to provide, in response to a DNS request from a client application, an IP address associated with a cloud region 212 to which the server appliance 210 is assigned, in the case of direct requests to the cloud region 212, or an anycast IP address associated with the dynamic request proxies 208, in the case of requests proxied by one of the server appliances 210, as discussed in greater detail below in conjunction with FIG. 9. The server appliance 210 is assigned to one of the cloud regions 212 based on an optimization performed by the optimization application 216 to reduce overall latency, as discussed in greater detail below in conjunction with FIG. 8.

Optimizing Traffic Steering to Cloud Computing Regions

Figure 6:
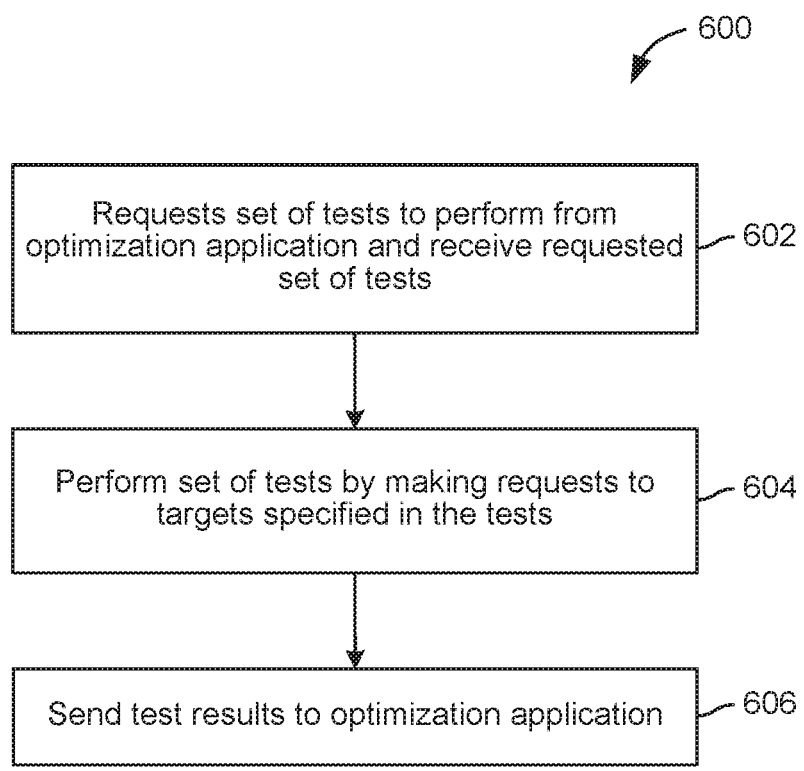
FIG. 6 is a flow diagram of method steps for discovering latencies between a client application and various regions of a cloud computing system, according to various embodiments.

FIG. 6 is a flow diagram of method steps for discovering latencies between a client application and various regions of a cloud computing system, according to various embodiments. Although the method steps are described with reference to the systems of FIGS. 2-5, persons skilled in the art will understand that any system configured to implement the method steps, in any order, falls within the scope of the present disclosure.

At step 602, the probe 201 included in the client application 202 requests a set of tests to perform from the optimization application 216 and receives the requested set of tests. In some embodiments, the probe 201 makes an API call to the optimization application 216 requesting the tests to perform. In such cases, the optimization application 216 returns a configuration file that includes the set of tests to perform in response to the request from the probe 201. In some embodiments, probing is performed every time after a client application is started on any client device, as the number of client application starts is assumed to be proportional to the overall number of traffic requests from those client applications. There may be some delay, however, between where the client application starts and when probing starts to ensure the probing does not interfere with latency-sensitive requests during starting of the client application.

At step 604, the probe 201 performs the set of tests by making requests to targets specified in the tests. In some embodiments, the targets may include Hyper Text Transfer Protocol (HTTP) endpoints or IP addresses. The requests to the targets are used to measure the duration of a standard HTTP request for an object of a specific size, and the payloads of the requests may be, e.g., randomly generated payloads, as the sizes of the payloads are more important than their contents.

In some embodiments, the tests require that potential paths to multiple cloud regions be tested. Further, in some embodiments, the probe 201 transmits multiple requests to different targets in parallel according to the method steps shown in FIG. 7, which is a more detailed illustration of step 604 of FIG. 6. In addition, in some embodiments, a wildcard name with a unique universally unique identifier (UUID) may be used for recursive resolver discovery and to determine the server appliance 210 making the decision for a direct request.

Figure 7:
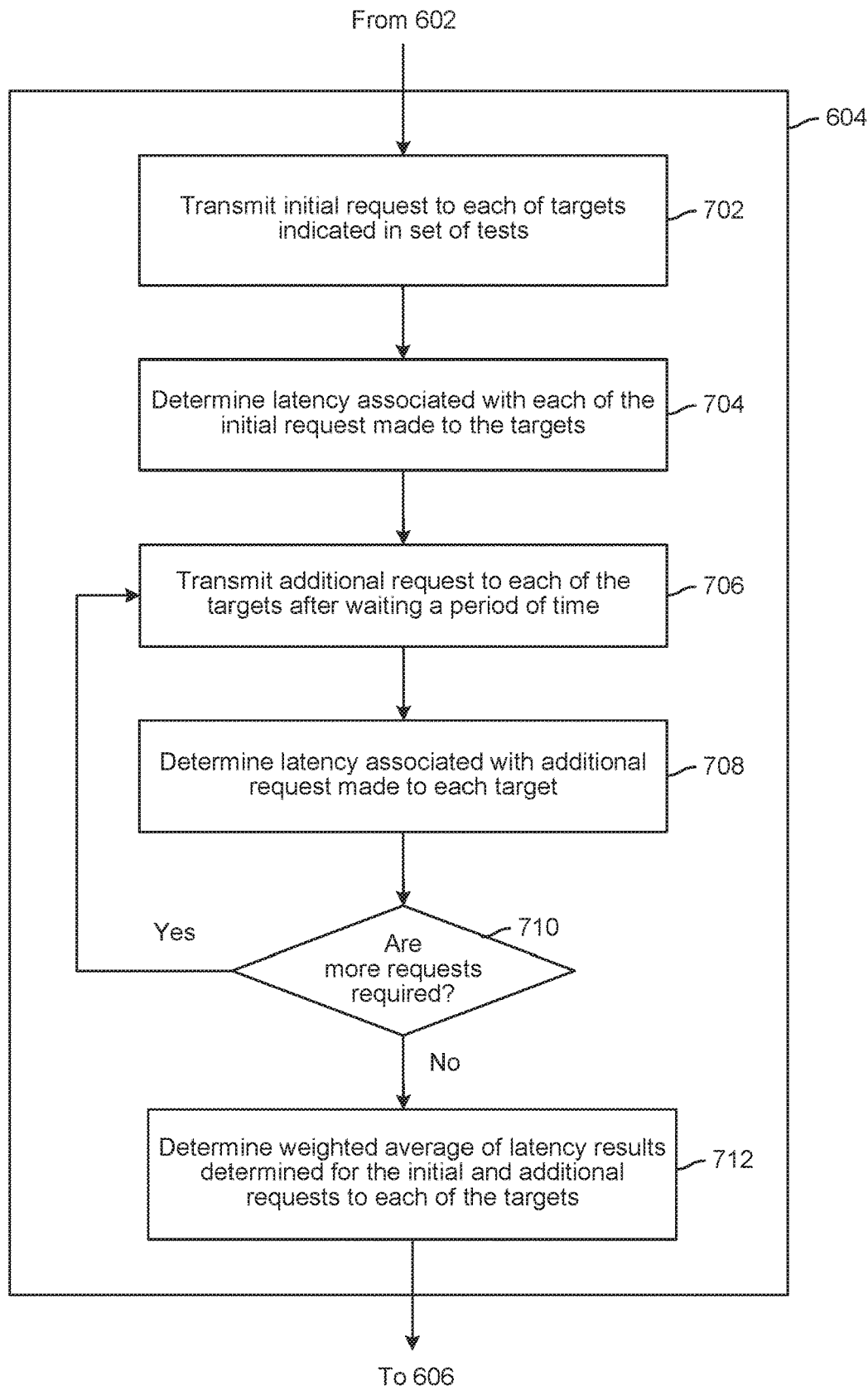
FIG. 7 is a more detailed illustration of one of the steps of FIG. 6, according to various embodiments.

As shown in FIG. 7, at step 702, the probe 201 makes an initial request to each of the targets indicated in the set of tests. Such an initial request opens a new connection, which includes extra overhead compared to subsequent requests.

At step 704, the probe 201 determines a latency associated with each of the initial requests made to the targets. In some embodiments, latency may be determined as an amount of time that elapses between when the probe 201 transmitted a request and when the probe 201 received a response to the request.

At step 706, the probe 201 transmits an additional request to each of the targets after waiting a period of time. Then, at step 708, the probe 201 determines a latency associated with each of the additional request. That is, the probing evaluates the latency characteristics of both initial and subsequent requests, both of which are expected to be initiated during the normal operation of the client application 202.

At step 710, the probe 201 determines whether additional requests are required. In some embodiments, a predefined number of additional requests may be made after the initial request. If the probe 201 determines that additional requests are required, then the method 600 returns to step 706, where the probe 201 transmits an additional request to the target after waiting a period of time from the previous request.

If, on the other hand, the probe 201 determines that no additional requests are required, then the method 600 continues to step 606, where the probe 201 sends the test results to the optimization application 216. The optimization application 216 may then determine a weighted average of the latency results for the initial and additional requests made by the probe 201 to each of the targets. In some embodiments, the weights used in such an average may be based on the typical ratio of requests on newly established connections versus requests on previously established connections. In alternative embodiments, the weighted average of latency results may be determined on the client side by, e.g., the probe 201.

Figure 8:
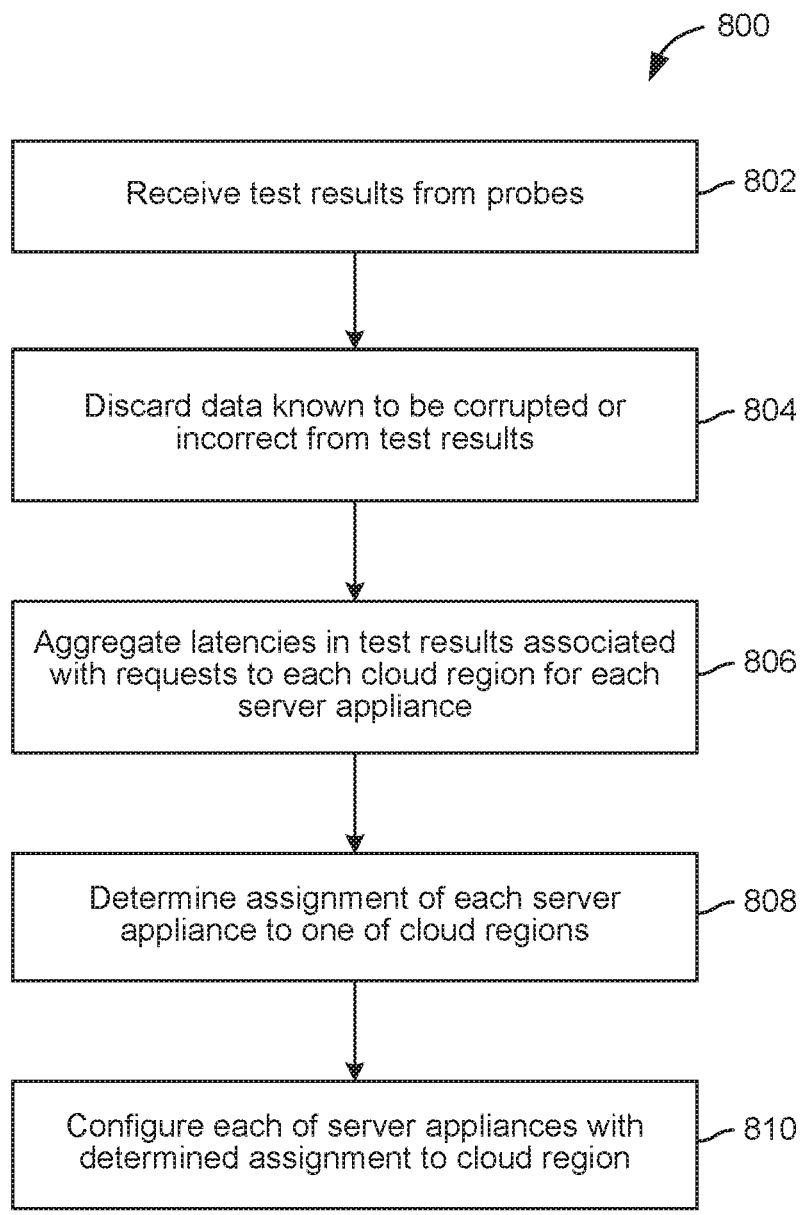
FIG. 8 is a flow diagram of method steps for determining how network traffic should be steered, according to various embodiments.

FIG. 8 is a flow diagram of method steps for determining how network traffic should be steered, according to various embodiments. Although the method steps are described with reference to the systems of FIGS. 2-5, persons skilled in the art will understand that any system configured to implement the method steps, in any order, falls within the scope of the present disclosure. Further, steps 804-810 may be repeated any number of times to update the traffic steering. For example, in some embodiments, the optimization application 216 performs the steps 804-810 periodically, such as once per day or a shorter interval of time.

As shown, a method 800 begins at step 802, where the optimization application 216 receives test results from a number of probes, such as the probe 201. In some embodiments, each of the probes may, after the starting of a corresponding client application, request a set of tests to perform from the optimization application 216, perform the set of tests to measure latency across possible paths from the corresponding client application to multiple cloud regions, and transmit the test results to the optimization application 216, as described above with respect to FIGS. 6-7. In such cases, probe test results may be received in real time at step 802.

At step 804, the optimization application 216 discards data known to be corrupted or incorrect from the test results. For example, out-of-date browsers could include unreliable timers or tend to corrupt data, and the optimization application 216 would discard test results from probes in client applications that run on such browsers. As another example, a device could go to sleep part way through a test, resulting in an incorrect latency that needs to be discarded.

At step 806, the optimization application 216 aggregates the latencies associated with requests to each cloud region for each of the server appliances that services clients. The aggregation essentially summarizes the latencies for each server appliance which services client applications. Returning to the example above of three cloud regions, the aggregated latencies could be as shown in Table 1.

TABLE 1

| Server appliance | Latency Cost [use, usw, euw] | Traffic |
| --- | --- | --- |
| iad001 | [80, 100, 200] | 1000 |
| fra001 | [110, 190, 40] | 500 |
| syd001 | [170, 80, 90] | 400 |
| nyc001 | [20, 120, 110] | 1200 |
| gru001 | [90, 150, 180] | 800 |

In this example, the latency costs of making dynamic requests to cloud regions "use," "usw," and "euw" have been aggregated for server appliances "iad001," "fra001," "syd001," "nyc001," and "gru001," which service client applications. In addition, Table 1 lists the traffic associated with each of the server appliances. By combining the latency cost of a server appliance making dynamic requests to a particular cloud region with the amount of traffic through the services appliance, the latency impact if the service appliance were assigned to the particular cloud region can be determined. In some embodiments, the traffic is approximated by the number of client application starts, which as described is assumed to be proportional to the number of dynamic requests made by those client applications. In other embodiments, the optimization application 216 may construct latency histograms for each of the cloud regions, rather than aggregating the latencies into a single value for each cloud region as shown in Table 1.

At step 808, the optimization application 216 determines an assignment of each of the server appliances 210 to one of the cloud regions 212 using an optimization. In some embodiments, such an optimization includes solving a linear programming model by minimizing a cost function, which is defined as the overall latency experienced by client applications, subject to the constraints that (1) the maximum traffic to each of the cloud regions 212 is less than a capacity constraint for that region, which may be specified by a user according to a desired traffic shape, (2) the maximum deviation of traffic to each of the cloud regions 212 at any point in time is less than a given percentage, and (2) the maximum deviation of traffic via direct and indirect routes is less than a given percentage. In such cases, solving the linear programming model may include iterating over all possible combinations of assignments of server appliances 210 to cloud regions 212 and finding one combination that minimizes the cost function. Although discussed herein with respect to one linear programming model for simplicity, in some embodiments, a series of linear programming models may be solved, each of which generates a different assignment of server appliances 210 to cloud regions 212 that represents a minimized latency profile subject to a different set of constraints on the maximum traffic to each cloud region 212 and the maximum deviation of traffic to the cloud regions 212.

In some embodiments, the overall latency in the cost function is determined as a summation of the aggregated latencies for each of the cloud regions 212 times the traffic share (e.g., the "Traffic" value from Table 1), for each of the server appliances 210. As described, this cost function captures the latency impact if service appliances were assigned to particular cloud regions. In mathematical terms, the overall latency may be expressed as $\Sigma([\text{Latency Feature}] \cdot \text{Traffic Share})$. The constraint that the maximum traffic to each cloud region is less than a corresponding capacity constraint may be expressed as Max Traffic to each region<[Capacity %] of Peak Traffic, where the capacity constraint is a percentage of the peak traffic. Further, the constraint on the maximum deviation of traffic to each of the cloud regions may be expressed as In each hour, traffic is within [% deviation] of equal load balance for each region. In addition, the constraint on the direct/indirect maximum traffic deviation may be expressed as Difference in traffic share sent over direct and indirect routes<Max %.

As described, the constraint on the maximum traffic is an absolute constraint on the peak amount of traffic to each cloud region, whereas the constraint on the maximum deviation of traffic is a relative constraint that the amount of traffic to each cloud region is not significantly different from the amount of traffic to other cloud regions. The constraint on the maximum traffic relates to infrastructure costs, as it is more expensive to handle a greater amount of traffic, while the constraint on the maximum deviation of traffic relates to availability risk, as the maximum percentage of the traffic share that is sent to each cloud region can affect whether the service remains available from that cloud region, i.e., whether a service outage occurs in the region. In addition, the constraint on the direct/indirect maximum traffic deviation balances the traffic sent over direct and indirect paths as client traffic shifts between the two types of paths. Probe data can be used to determine when an authoritative DNS nameserver 206 and a dynamic request proxy 208 servicing a particular client are on two different server appliances 210, which is only a problem when the two server appliances 210 are assigned to different cloud regions 212. The constraint on the direct/indirect maximum traffic deviation ensures the number of such split clients are below a predefined constraint. As a result, the linear programming optimization can be used to balance latency, infrastructure costs, and availability risk based on user preferences, which can be specified by changing the values of the constraints on the maximum traffic, the maximum deviation of traffic, and the maximum deviation of direct/indirect traffic.

In some embodiments, the optimization application 216 may also determine assignments of each of the server appliances 210 to the cloud regions 212 with one or more of the cloud regions 212 removed. That is, the optimization application 216 may predetermine, for failover purposes, where traffic should be steered if the one or more cloud regions 212 were to become unavailable. It should be understood that additional probe data is not required for such a determination, as the network paths are independent of each other and every possible network path has already been tested by the probes.

At step 810, each of the server appliances 210 is configured with the determined assignment to one of the cloud regions 212. As described, such a configuration may include the server appliances 210 retrieving their assigned cloud regions from the optimization application 216 running within a cloud region 212. In some embodiments, the configuration from the optimization application 216 may also be distributed to all of the cloud regions 212, such that the server appliances 210 can contact any cloud region 212 for an updated state, and the server appliances 210 may attempt to gather their configuration from all of the cloud regions regardless 212 for resiliency purposes. In some embodiments, an incrementing serial number is also used to track configuration versions to prevent an old version from taking precedence over a newer version.

FIG. 9 is a flow diagram of method steps for request load steering, according to various embodiments. Although the method steps are described with reference to the systems of FIGS. 2-5, persons skilled in the art will understand that any system configured to implement the method steps, in any order, falls within the scope of the present disclosure.

As shown, a method 900 begins at step 902, where the client application 202 transmits a DNS request to the recursive resolver 204 to resolve a hostname. As described, the recursive resolver 204 is configured to perform recursive lookups against authoritative DNS nameservers, until one of the authoritative DNS nameservers 206 is reached that can translate the hostname into an IP address.

At step 904, the recursive resolver 204 forwards the DNS request to resolve the hostname to one of the authoritative DNS nameservers 206. In some embodiments, the recursive resolver 204 may find a closest authoritative DNS nameserver 206 having the authority to resolve the hostname into an IP address. Step 904 assumes that the recursive resolver 204 has not cached a translation of the hostname to an IP address, in which case the recursive resolver 204 may respond with the cached IP address without routing the DNS request to the authoritative DNS nameserver 206.

At step 906, the authoritative DNS nameserver 206 that receives the DNS request provides to the recursive resolver 204 either an IP address associated with one of the cloud regions 212 or an anycast IP address associated with the dynamic request proxies 208 for proxying requests to one of the cloud regions 212. It should be understood that, in some embodiments, there may be more than one IP address associated with each cloud region 212. As described, the percentage of direct IP addresses to anycast IP addresses that the authoritative DNS nameserver 206 responds with may be configured in any technically feasible manner. For example, traffic could be shifted back and forth between direct and indirect paths, depending on whether the dynamic request proxies 208 are having issues (in which case the direct paths would be used), by having the authoritative DNS nameserver 206 respond with different percentages of direct and anycast IP addresses. As another example, traffic could be sent entirely through the dynamic request proxies 208 if there are Internet ingress problem for specific cloud region(s). It is assumed that the server appliances 210 have already been assigned to particular cloud regions 212 and the server appliances 210 have been configured accordingly, as described above in conjunction with step 810 of the method 800. In alternative embodiments, the authoritative DNS nameserver 206 may provide a unicast IP address associated with a particular dynamic request proxies 208 rather than an anycast IP address.

At step 908, the recursive resolver 204 forwards the IP address associated with one of the cloud regions 212 or the anycast IP address associated with the dynamic request proxies 208 to the client application 202 as a response to the DNS request. Assuming the client application 202 receives an IP address associated with one of the cloud regions 212, then at step 910, the client application 202 makes a request directly to that cloud region 212 using the IP address. For example, the request could be a search request for a user-provided term from a video streaming service, or any other type of dynamic content. The cloud region 212 responds to the direct request at step 912.

Otherwise, if the client application 202 receives the anycast IP address associated with the dynamic request proxies 208, then at step 914, the client application 202 makes a request (e.g., a search request) using the anycast IP address. As described, the dynamic request proxy 208 to which a request that includes the anycast IP address is routed may depend on anycast routing, which generally routes requests along paths with the least number of hops, and the dynamic request proxy 208 may or may not be included in a server appliance 210 that is different from the server appliance 210 that provided the anycast IP address at step 906.

At step 916, the dynamic request proxy 208 included in one of the server appliances 210 that receives the request via anycast routing forwards the request to the cloud region 212 that the server appliance 210 is assigned to.

At step 918, the cloud region 212 to which the request is forwarded responds to the request. For example, the cloud region 212 could respond with the requested dynamic content (e.g., a search result) to the dynamic request proxy 208. Then, at step 920, the dynamic request proxy 208 forwards the response from the cloud region 212 to the client application 202.

At least one technical advantage of the disclosed techniques relative to the prior art is that the amount of traffic reaching each of multiple cloud regions is modeled and controlled centrally, with greater precision. In particular, control of network traffic associated with dynamic requests from client applications to cloud regions is aligned between authoritative DNS nameservers and dynamic request proxies by implementing the authoritative DNS nameservers on the CDN infrastructure. Less cloud resources headroom is required as a result of such an alignment, which limits the shifting of traffic between cloud regions, including as clients are shifted between direct and indirect paths. As a result, the alignment provides safety and reliability, as the route that traffic takes has a constrained/known impact on the required cloud capacity to service dynamic requests. Probing and optimization are also performed to determine how traffic can be steered to cloud regions for a desired trade-off of cost, availability, and latency. In particular, the optimization accounts for both direct paths to the cloud regions and indirect paths through dynamic request proxies, permitting a "global" latency reduction. More specifically, the aggregate latency between client applications and cloud regions can be reduced, while reducing the overall size of the cloud infrastructure (e.g., the number of servers by avoiding "large" regions with high maximum peak traffic, reducing the risk of failure of any cloud region by minimizing how much traffic is sent to each region at any given time, and also constraining the maximum deviation of the traffic sent over direct and indirect paths as client traffic shifts between the two types of paths . . . . In addition, the central control of traffic steering reduces the potential points of failure relative to prior art techniques. Experience has shown that techniques disclosed herein also scale better than prior art approaches in which direct and indirect traffic flows to cloud regions are separately controlled using authoritative DNS nameservers and dynamic request proxies, respectively. These technical advantages represent one or more technological advancements over prior art approaches.

1. Some embodiments include a computer-implemented method for configuring network traffic steering to a plurality of regions of a cloud computing system, the method comprising receiving a plurality of measurements of latencies across a plurality of network paths between a plurality of client applications and the plurality of regions of the cloud computing system, determining, based on the measurements, an assignment of each server included in a plurality of servers to one of the regions included in the plurality of regions of the cloud computing system, wherein each server included in the plurality of servers includes an authoritative domain name system (DNS) nameserver and a dynamic request proxy, and configuring each server included in the plurality of servers based on the assignment of the server to the one of the regions included in the plurality of regions of the cloud computing system.

2. The computer-implemented method of clause 1, further comprising, prior to determining the assignment of each server included in the plurality of servers, aggregating the measurements based on associations between the client applications and the plurality of servers.

3. The computer-implemented method of any of clauses 1-2, wherein determining the assignment of each server included in the plurality of servers comprises solving an optimization problem to reduce an overall latency experienced by the client applications when communicating with the plurality of regions of the cloud computing system.

4. The computer-implemented method of any of clauses 1-3, wherein the overall latency is reduced subject to constraints on a maximum amount of traffic to each region included in the plurality of regions of the cloud computing system, a maximum deviation of the amount of traffic to each region included in the plurality of regions of the cloud computing system, and a maximum deviation of traffic to the plurality of regions of the cloud computing system over direct paths and indirect paths via dynamic request proxies.

5. The computer-implemented method of any of clauses 1-4, wherein the optimization problem comprises a linear programming problem.

6. The computer-implemented method of any of clauses 1-5, wherein determining each measurement included in the plurality of measurements of latencies comprises transmitting a plurality of requests via one of a plurality of network paths to one of the regions included in the plurality of regions of the cloud computing system, and determining response times to the requests.

7. The computer-implemented method of any of clauses 1-6, wherein each measurement included in the plurality of measurements is determined subsequent to starting one of the client applications included in the plurality of client applications.

8. The computer-implemented method of any of clauses 1-7, further comprising discarding data from the measurements that is corrupted or incorrect.

9. The computer-implemented method of any of clauses 1-8, wherein the client application is a video streaming application.

10. Some embodiments include a computer-readable storage medium including instructions that, when executed by a processor, cause the processor to configure network traffic steering to a plurality of regions of a cloud computing system by performing the steps of receiving a plurality of measurements of latencies across a plurality of network paths between a plurality of client applications and the plurality of regions of the cloud computing system, determining, based on the measurements, an assignment of each server included in a plurality of servers to one of the regions included in the plurality of regions of the cloud computing system, wherein each server included in the plurality of servers includes an authoritative domain name system (DNS) nameserver and a dynamic request proxy, and configuring each server included in the plurality of servers based on the assignment of the server to the one of the regions included in the plurality of regions of the cloud computing system.

11. The computer-readable storage medium of clause 10, the steps further comprising, prior to determining the assignment of each server included in the plurality of servers, aggregating the measurements based on associations between the client applications and the plurality of servers.

12. The computer-readable storage medium of any of clauses 10-11, wherein determining the assignment of each server included in the plurality of servers comprises solving an optimization problem to reduce an overall latency experienced by the client applications when communicating with the plurality of regions of the cloud computing system.

13. The computer-readable storage medium of any of clauses 10-12, wherein the overall latency is reduced subject to constraints on a maximum amount of traffic to each region included in the plurality of regions of the cloud computing system, a maximum deviation of the amount of traffic to each region included in the plurality of regions of the cloud computing system, and a maximum deviation of traffic to the plurality of regions of the cloud computing system over direct paths and indirect paths via dynamic request proxies.

14. The computer-readable storage medium of any of clauses 10-13, wherein the optimization problem comprises a linear programming problem.

15. The computer-readable storage medium of any of clauses 10-14, wherein the overall latency is determined as a sum of a product of aggregated latencies for each region included in the plurality of regions of the cloud computing system and a traffic share for each server included in the plurality of servers, the maximum amount of traffic to each region included in the plurality of regions of the cloud computing system is defined as a percentage of a maximum capacity, the maximum deviation of the amount of traffic to each region included in the plurality of regions of the cloud computing system is defined as a percentage deviation, and the maximum deviation of traffic to the plurality of regions of the cloud computing system over the direct paths and the indirect paths is defined as a percentage deviation.

16. The computer-readable storage medium of any of clauses 10-15, wherein determining each measurement included in the plurality of measurements of latencies comprises transmitting a plurality of requests via one of a plurality of network paths to one of the regions included in the plurality of regions of the cloud computing system, and determining response times to the requests.

17. The computer-readable storage medium of any of clauses 10-16, wherein at least two of the plurality of measurements of latencies across the plurality of network paths are determined in parallel.

18. Some embodiments include a system, comprising a plurality of probes executing on corresponding client devices, wherein each probe included in the plurality of probes measures latencies across a plurality of network paths from the corresponding client to a plurality of regions of a cloud computing system, and an optimization application that, when executed on a computing device, configures network traffic steering to a plurality of regions of a cloud computing system by performing the steps of: receiving the measured latencies from the plurality of probes, determining, based on the measured latencies, an assignment of each server included in a plurality of servers to one of the regions included in the plurality of regions of the cloud computing system, and configuring each server included in the plurality of servers based on the assignment of the server to the one of the regions included in the plurality of regions of the cloud computing system.

19. The system of clause 18, wherein each probe included in the plurality of probes receives a set of tests indicating the plurality of network paths from the corresponding client to the plurality of regions of the cloud computing system, and measures, based on the set of tests, the latencies across the plurality of network paths from the corresponding client to the plurality of regions of the cloud computing system.

20. The system of any of clauses 18-19, wherein each server included in the plurality of servers includes an authoritative domain name system (DNS) nameserver and a dynamic request proxy.

Any and all combinations of any of the claim elements recited in any of the claims and/or any elements described in this application, in any fashion, fall within the contemplated scope of the present disclosure and protection.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a ""module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine. The instructions, when executed via the processor of the computer or other programmable data processing apparatus, enable the implementation of the functions/acts specified in the flowchart and/or block diagram block or blocks. Such processors may be, without limitation, general-purpose processors, special-purpose processors, application-specific processors, or field-programmable gate arrays.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A computer-implemented method for configuring network traffic steering to a plurality of regions of a cloud computing system, the method comprising:
    receiving a plurality of measurements of latencies across a plurality of network paths between a plurality of client applications and the plurality of regions of the cloud computing system;
    determining, based on the plurality of measurements, an assignment of each server included in a plurality of servers to one of the regions included in the plurality of regions of the cloud computing system, wherein each server included in the plurality of servers includes an authoritative domain name system (DNS) nameserver and a dynamic request proxy; and
    configuring each server included in the plurality of servers based on the assignment of the server to the one of the regions included in the plurality of regions of the cloud computing system.

2. The computer-implemented method of claim 1, further comprising, prior to determining the assignment of each server included in the plurality of servers, aggregating the measurements based on associations between the client applications and the plurality of servers.

3. The computer-implemented method of claim 1, wherein determining the assignment of each server included in the plurality of servers comprises solving an optimization problem to reduce an overall latency experienced by the client applications when communicating with the plurality of regions of the cloud computing system.

4. The computer-implemented method of claim 3, wherein the overall latency is reduced subject to constraints on a maximum amount of traffic to each region included in the plurality of regions of the cloud computing system, a maximum deviation of the amount of traffic to each region included in the plurality of regions of the cloud computing system, and a maximum deviation of traffic to the plurality of regions of the cloud computing system over direct paths and indirect paths via dynamic request proxies.

5. The computer-implemented method of claim 3, wherein the optimization problem comprises a linear programming problem.

6. The computer-implemented method of claim 1, wherein determining each measurement included in the plurality of measurements of latencies comprises:
    transmitting a plurality of requests via one of a plurality of network paths to one of the regions included in the plurality of regions of the cloud computing system; and
    determining response times to the requests.

7. The computer-implemented method of claim 1, wherein each measurement included in the plurality of measurements is determined subsequent to starting one of the client applications included in the plurality of client applications.

8. The computer-implemented method of claim 1, further comprising discarding data from the measurements that is corrupted or incorrect.

9. The computer-implemented method of claim 1, wherein each client application included in the plurality of client applications is a video streaming application.

10. A non-transitory computer-readable storage medium including instructions that, when executed by a processor, cause the processor to configure network traffic steering to a plurality of regions of a cloud computing system by performing the steps of:
    receiving a plurality of measurements of latencies associated with the plurality of regions of the cloud computing system;
    determining, based on the plurality of measurements, an assignment of each server included in a plurality of servers to one of the regions included in the plurality of regions of the cloud computing system; and
    configuring each server included in the plurality of servers based on the assignment of the server to the one of the regions included in the plurality of regions of the cloud computing system.

11. The computer-readable storage medium of claim 10, the steps further comprising, prior to determining the assignment of each server included in the plurality of servers, aggregating the measurements based on associations between a plurality of client applications and the plurality of servers.

12. The computer-readable storage medium of claim 11, wherein determining the assignment of each server included in the plurality of servers comprises solving an optimization problem to reduce an overall latency experienced by the plurality of client applications when communicating with the plurality of regions of the cloud computing system.

13. The computer-readable storage medium of claim 12, wherein the overall latency is reduced subject to constraints on a maximum amount of traffic to each region included in the plurality of regions of the cloud computing system, a maximum deviation of the amount of traffic to each region included in the plurality of regions of the cloud computing system, and a maximum deviation of traffic to the plurality of regions of the cloud computing system over direct paths and indirect paths via dynamic request proxies.

14. The computer-readable storage medium of claim 13, wherein the optimization problem comprises a linear programming problem.

15. The computer-readable storage medium of claim 13, wherein:
the overall latency is determined as a sum of a product of aggregated latencies for each region included in the plurality of regions of the cloud computing system and a traffic share for each server included in the plurality of servers;
the maximum amount of traffic to each region included in the plurality of regions of the cloud computing system is defined as a percentage of a maximum capacity;
the maximum deviation of the amount of traffic to each region included in the plurality of regions of the cloud computing system is defined as a percentage deviation; and
the maximum deviation of traffic to the plurality of regions of the cloud computing system over the direct paths and the indirect paths is defined as a percentage deviation.

16. The computer-readable storage medium of claim 10, wherein determining each measurement included in the plurality of measurements of latencies comprises:
transmitting a plurality of requests via one of a plurality of network paths to one of the regions included in the plurality of regions of the cloud computing system; and
determining response times to the requests.

17. The computer-readable storage medium of claim 10, wherein at least two of the plurality of measurements of latencies are determined in parallel.

18. A system, comprising:
one or more memories storing instructions;
one or more processors that are coupled to the one or more memories and, when executing the instructions, perform the steps of:
determining, for each server included in a plurality of servers, an assignment of the server to a different region included in a plurality of regions of a cloud computing system, and
for each server included in the plurality of servers, configuring the server based on the assignment of the server to the different region.

19. The system of claim 18, wherein the one or more processors, when executing the instructions, further perform the steps of:
receiving measured latencies from a plurality of probes executing on corresponding client devices, wherein each probe included in the plurality of probes:
receives a set of tests indicating a plurality of network paths from the corresponding client to the plurality of regions of the cloud computing system; and
measures, based on the set of tests, the latencies across the plurality of network paths from the corresponding client to the plurality of regions of the cloud computing system.

20. The system of claim 18, wherein each server included in the plurality of servers includes an authoritative domain name system (DNS) nameserver and a dynamic request proxy.

* * * * *